United States Patent
Belcher et al.

(10) Patent No.: US 7,003,317 B2
(45) Date of Patent: Feb. 21, 2006

(54) MOTORCYCLE HELMET COMMUNICATION CABLE

(76) Inventors: Willie S. Belcher, P.O. Box 329, Plymouth, NC (US) 27962; Michael A. Belcher, 209 Plowland Ct., Knightdale, NC (US) 27545; Cartaveta R. Belcher, 241 Old Fairground Rd., Willow Springs, NC (US) 27592

( * ) Notice: Subject to any disclaimer, the term of this patent is extended or adjusted under 35 U.S.C. 154(b) by 560 days.

(21) Appl. No.: 10/350,119

(22) Filed: Jan. 24, 2003

(65) Prior Publication Data

US 2004/0204061 A1    Oct. 14, 2004

(51) Int. Cl.
*H04M 1/00* (2006.01)
*H04B 1/38* (2006.01)

(52) U.S. Cl. ............ 455/556.1; 455/90.3; 455/575.2; 439/617; 439/623; 439/624; 439/625; 439/669; 379/420.04; 379/441; 379/443

(58) Field of Classification Search ............ 455/556.1, 455/559, 575.2, 575.6, 90.3; 439/617–619, 439/623–625, 640, 669; 379/420.04, 428.02, 379/428.04, 428.05, 441–443, 447
See application file for complete search history.

(56) References Cited

U.S. PATENT DOCUMENTS

| | | | | |
|---|---|---|---|---|
| 4,672,306 A | * | 6/1987 | Thong | 324/72.5 |
| 4,855,844 A | * | 8/1989 | Snodgrass | 360/22 |
| 5,053,891 A | * | 10/1991 | Snodgrass | 360/22 |
| 5,420,739 A | * | 5/1995 | Yokozawa et al. | 360/137 |
| 6,350,150 B1 | * | 2/2002 | DeLadurantaye, III | 439/502 |
| 6,425,783 B1 | * | 7/2002 | Touboul | 439/638 |
| 6,623,295 B1 | * | 9/2003 | DeLadurantaye, III | 439/502 |
| 2001/0034157 A1 | * | 10/2001 | DeLadurantaye, III | 439/505 |
| 2002/0160723 A1 | | 10/2002 | Yagi | |
| 2002/0181729 A1 | * | 12/2002 | Smith | 381/381 |
| 2003/0139089 A1 | * | 7/2003 | DeLadurantaye, III | 439/502 |

FOREIGN PATENT DOCUMENTS

| | | | |
|---|---|---|---|
| FR | 2 757 717 | | 6/1998 |
| GB | 2167226 A | * | 5/1986 |
| JP | 2001268182 | | 9/2001 |

* cited by examiner

*Primary Examiner*—Binh K. Tieu
(74) *Attorney, Agent, or Firm*—Richard C. Litman

(57) ABSTRACT

Motorcycle helmet communications cables connecting substantially all models of cellular telephones to a "CHATTERBOX" HJC-GMRS X1 rider-to-rider motorcycle helmet communication system. A length of audio cable is provided with a 3.5 mm stereo plug at one end designed to engage the auxiliary input jack of the motorcycle helmet communication system. At the second end of the cable a 2.5 mm stereo plug is provided for engagement with the hands-free outlet of any cellular telephone. The first plug includes four co-axial contacts for engaging contacts within the auxiliary-input jack of the communication system. The second plug has only three co-axial contacts for engaging contacts in the hands-free jack of most cellular telephones. The internal wire connections between the contacts of the first plug and the contacts of the second plug are selected to enable most cellular phones with hands-free jacks to operate with the HJC-GMRS X1 rider-to-rider motorcycle helmet communication system.

14 Claims, 2 Drawing Sheets

MOTORCYCLE HELMET COMMUNICATION CABLE

BACKGROUND OF THE INVENTION

1. Field of the Invention

The present invention relates to motorcycle helmet communication systems, and more specifically to cables for operatively connecting cellular telephones to a "CHATTERBOX" HJC-GMRS X1 motorcycle helmet communication system.

2. Description of the Related Art

Motorcycle helmet communication systems are known in the prior art wherein a plurality of communication components is provided for the user. For example, U.S. Patent Application Publication number 2002/0160723 A1 teaches a helmet with integral communications system. The communications system of the helmet communicates with a control panel mounted on a part of a motorcycle. The control panel includes a radio with a mini-disk player, a cellular telephone and a navigation system. French publication number 2 757 717 teaches a communication system for a motorcycle helmet that includes a cellular telephone connection and walkie-talkie communication.

The "CHATTERBOX" company produces a wide variety of communication systems attachable to pre-existing helmets. The rider-to-rider model HJC-GMRS X1 motorcycle helmet communications system includes an intercom system, stereo unit, and inputs for selectively connecting an audio system and/or a cellular telephone to the helmet mounted system.

One known problem associated with using the HJC-GMRS X1 motorcycle helmet communications system is that the connecting cable for the cellular telephone input supplied by the manufacturer is designed to work with only a limited number (approximately 2 percent) of the known cellular telephones in use at this time. Riders with most cellular telephones are therefore precluded from operating their phones in the hands-free mode when using the HJC-GMRS X1 motorcycle helmet communications system.

None of the above inventions and patents, taken either singularly or in combination, is seen to describe the instant invention as claimed. Thus motorcycle helmet communications cables solving the aforementioned problem are desired.

SUMMARY OF THE INVENTION

The present invention provides cables for connecting substantially all of the various models of cellular telephones to a "CHATTERBOX" HJC-GMRS X1 rider-to-rider motorcycle helmet communication system. A length of audio cable is provided with a 3.5 mm stereo plug at one end designed to matingly engage the auxiliary input jack of the motorcycle helmet communication system. At the second end of the cable a 2.5 mm stereo plug is provided for mating engagement with the hands-free outlet of any cellular telephone. The first plug includes four co-axial contacts for engaging contacts within the auxiliary-input jack of the communication system. The second plug has only three co-axial contacts for engaging contacts in the hands-free jack of most cellular telephones. The internal wire connections between the contacts of the first plug and the contacts of the second plug is selected so as to enable most cellular phones with hands-free jacks to operate with the HJC-GMRS X1 rider-to-rider motorcycle helmet communication system.

Accordingly, it is a principal object of the invention to provide motorcycle helmet communications cables for connecting substantially all cellular telephones to the "CHATTERBOX" HJC-GMRS X1 rider-to-rider motorcycle helmet communications system.

It is another object of the invention to provide motorcycle helmet communications cables that permits any user of the "CHATTERBOX" HJC-GMRS X1 rider-to-rider motorcycle helmet communication system to connect any presently known brand of cellular telephone with the system.

It is also a further object of the invention to provide a motorcycle helmet communication cable for connecting substantially all analog cellular telephones having a hands free outlet jack to the "CHATTERBOX" HJC-GMRS X1 rider-to-rider motorcycle helmet communications system.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
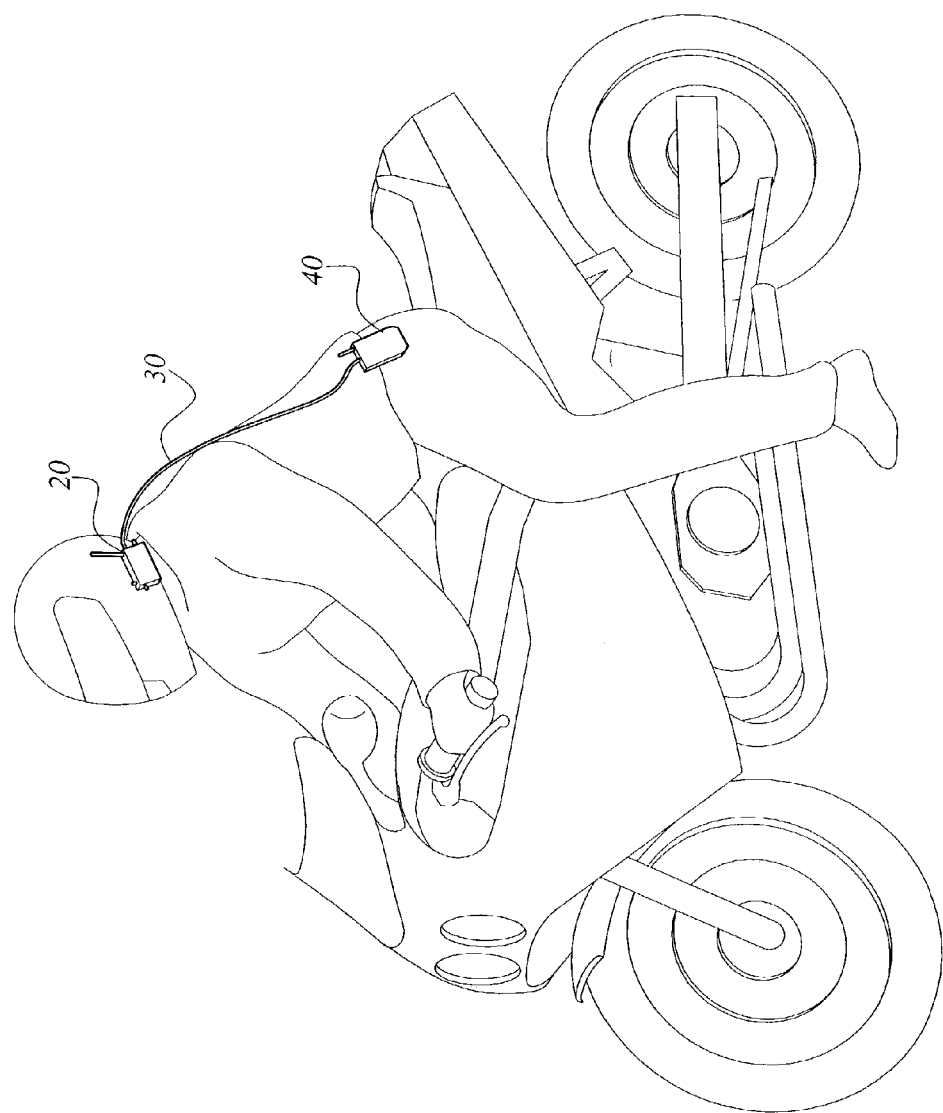
FIG. 1 is an environmental, perspective view of a motorcycle helmet communications cable according to the present invention connecting a cellular telephone to a helmet mounted communications system.

The present invention provides cables for connecting substantially all cellular telephones to a "CHATTERBOX" HJC-GMRS X1 rider-to-rider motorcycle helmet communication system for hands-free operation with the system. FIG. 1 shows a length of audio cable 30 operatively connecting a cellular telephone 40 to the communication system 20 attached to the helmet of a motorcycle rider.

Figure 2:
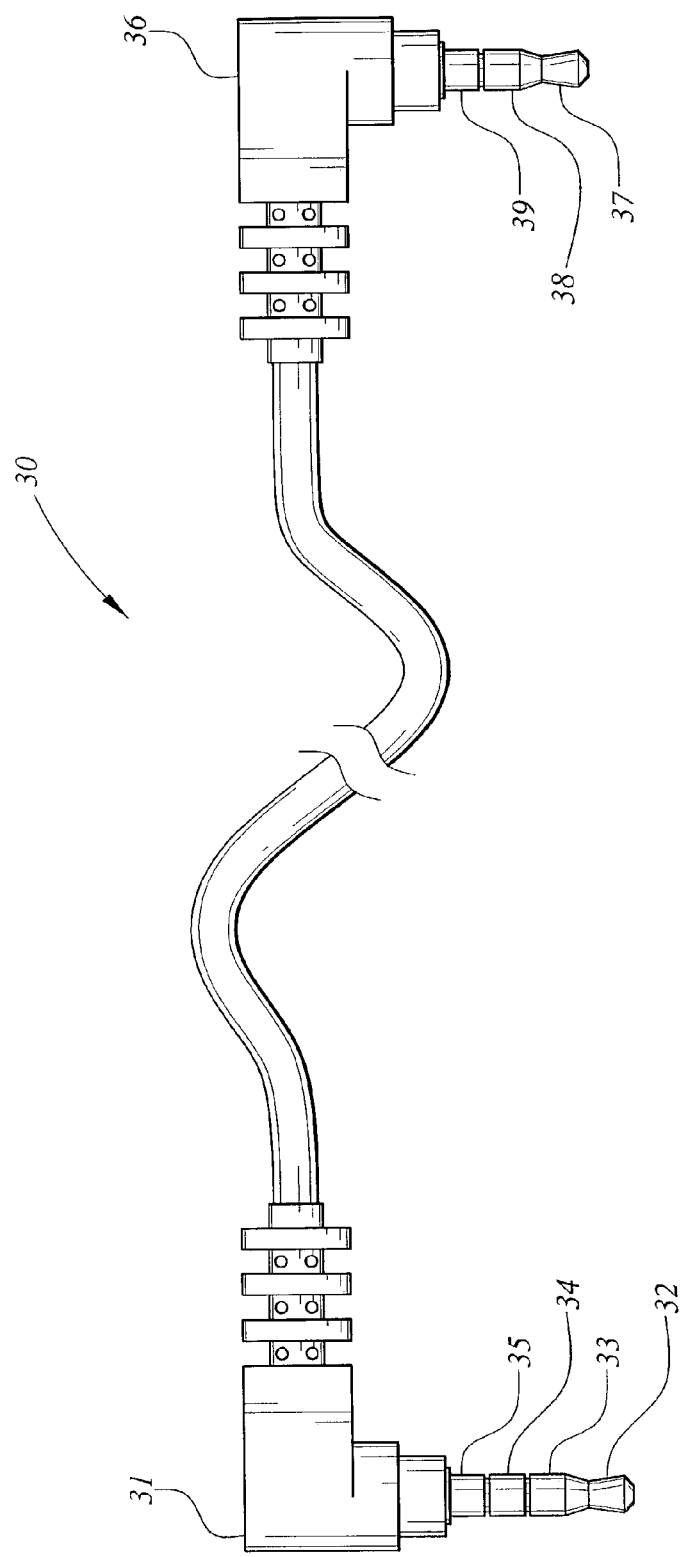
FIG. 2 is a side view of the motorcycle helmet communications cable according to the present invention.

Referring to FIG. 2, cable 30 is provided with a 3.5 mm stereo plug 31 at one end designed for plugging into the auxiliary input jack of the "CHATTERBOX" HJC-GMRS X1 rider-to-rider motorcycle helmet communication system 20. At the second end of the cable 30, a 2.5 mm stereo plug 36 is provided for plugging into the hands-free input/output jack of all contemporary cellular telephones.

The first plug 31 includes four co-axial contacts 32–35 positioned on the prong for operative engagement with contacts within the auxiliary-input jack of the communication system 20. The second plug 36 has only three co-axial contacts 37–39 that operatively engage the contacts in the hands-free input/output jack of most cellular telephones.

Cable 30 is of conventional low-noise construction and includes wire conductors and a spiral shield surrounded by a flexible plastic jacket. The cable jacket may be formed of either polyurethane or polyvinyl chloride. The first plug 31 and second plug 36 are each conveniently formed with a ninety-degree bend in the body of the plug to facilitate grasping of the plugs for insertion and removal.

The internal electrical connections of the cable 30, between contacts 32–35 of the first plug 31, the wire conductors, and contacts 37–39 of the second plug 36 are made so as to enable most cellular phones with hands-free jacks to operate with the microphone and speakers of the HJC-GMRS X1 motorcycle helmet communication system.

Conductors (not shown) of cable 30 connect contacts 32–34, respectively of plug 31 with contacts 37–39, respectively of plug 36. In this cable configuration, all "NEXTEL" cellular telephones can be used with the "CHATTERBOX" HJC-GMRS X1 motorcycle helmet communication system. This includes models 160, 185, 190 and "STARTEC" digital and analog cellular telephones with 2-way communication.

In a second embodiment of the cable 30, contacts 33–35, respectively of plug 31 are connected to contacts 38, 37 and 39, respectively of plug. With cable 30 configured in this fashion, substantially all analog cellular telephones (other than the "NEXTEL" and "STARTEC" types) with hands-free input/output jacks can be used with the "CHATTERBOX" HJC-GMRS X1 motorcycle helmet communication system. This includes all "MOTOROLA", "SAMSUNG", the "STARTEC" analog and "NOKIA" cellular telephones and all "QUALCOM", "ATT", "VERIZON", and "BELL SOUTH" cellular telephones, i.e. telephones without 2-way communication.

FIG. 2 shows cable 30 as a length of straight flexible cable. Cable 30 is preferably between 4 to 7 feet in length and may be formed in a stretchable-coiled configuration.

With cables, as described above, substantially all cellular telephones having hands-free input/output jacks can be connected to the "CHATTERBOX" HJC-GMRS X1 motorcycle helmet communication system for safe and convenient hands-free operation.

It is to be understood that the present invention is not limited to the embodiments described above, but encompasses any and all embodiments within the scope of the following claims.

We claim:

1. A motorcycle helmet communications cable comprising:
    a flexible length of audio cable having a spiral shield, a plastic jacket, and at least three internal wire conductors;
    a first stereo plug attached to one end of said cable and a second stereo plug attached to a second end of said cable;
    said first plug including a shaft having a first contact formed at the tip of the shaft with a second co-axial contact, a third co-axial contact and a fourth co-axial contact sequentially arranged along the shaft and separated by insulating spacers, said first plug being sized for operatively engaging co-operating contacts in the auxiliary input jack of the "CHATTERBOX" HJC-GMRS X1 rider-to-rider motorcycle helmet communication system;
    said second plug including a shaft having a fifth contact formed at the tip of the shaft with a sixth co-axial contact and a seventh co-axial contact extending along the length of the shaft and separated by insulating spacers, said second plug being sized for operatively engaging co-operating contacts in the hands-free input/output jack of cellular telephones;
    wherein said first contact of said first plug is connected by a first wire conductor to said fifth contact of said second plug, said second contact of said first plug is connected by a second wire conductor to said sixth contact of said second plug and said third contact of said first plug is connected by a third wire conductor to said seventh contact of said second plug.

2. The motorcycle helmet communications cable of claim 1, wherein said cable is of a low noise construction including a spiral shield.

3. The motorcycle helmet communications cable of claim 2, wherein said cable includes a plastic jacket.

4. The motorcycle helmet communications cable of claim 3, wherein said jacket is formed of polyurethane material.

5. The motorcycle helmet communications cable of claim 4, wherein said cable is coiled.

6. The motorcycle helmet communications cable of claim 3, wherein said jacket is formed of PVC material.

7. The motorcycle helmet communications cable of claim 6, wherein said cable is coiled.

8. A motorcycle helmet communications cable comprising:
    a flexible length of audio cable having a spiral shield, a plastic jacket, and at least three internal wire conductors;
    a first stereo plug attached to one end of said audio cable and a second stereo plug attached to a second end of said audio cable;
    said first plug including a shaft having a first contact formed at the tip of the shaft with a second co-axial contact, a third co-axial contact and a fourth co-axial contact sequentially arranged along the shaft and separated by insulating spacers, said first plug being sized for operatively engaging co-operating contacts in the auxiliary input jack of the "CHATTERBOX" HJC-GMRS X1 rider-to-rider motorcycle helmet communication system;
    said second plug including a shaft having a fifth contact formed at the tip of the shaft with a sixth co-axial contact and a seventh co-axial contact extending along the length of the shaft and separated by insulating spacers, said second plug being sized for operatively engaging co-operating contacts in the hands-free input/output jack of cellular telephones;
    wherein said second contact of said first plug is connected by a first wire conductor to said sixth contact of said second plug, said third contact of said first plug is connected by a second wire conductor to said fifth contact of said second plug and said fourth contact of said first plug is connected by a third wire conductor to said seventh contact of said second plug.

9. The motorcycle helmet communications cable of claim 8, wherein said cable is of a low noise construction including a spiral shield.

10. The motorcycle helmet communications cable of claim 9, wherein said cable includes a plastic jacket.

11. The motorcycle helmet communications cable of claim 10, wherein said jacket is formed of polyurethane material.

12. The motorcycle helmet communications cable of claim 11, wherein said cable is coiled.

13. The motorcycle helmet communications cable of claim 10, wherein said jacket is formed of PVC material.

14. The motorcycle helmet communications cable of claim 13, wherein said cable is coiled.

* * * * *